(12) United States Patent
Bednekoff et al.

(10) Patent No.: US 8,095,164 B2
(45) Date of Patent: Jan. 10, 2012

(54) ADAPTIVE INTERFERENCE AVOIDANCE METHOD

(75) Inventors: George Bednekoff, Plano, TX (US); Richard D'Silva, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 690 days.

(21) Appl. No.: 11/839,423

(22) Filed: Aug. 15, 2007

(65) Prior Publication Data

US 2008/0076463 A1 Mar. 27, 2008

Related U.S. Application Data

(60) Provisional application No. 60/847,183, filed on Sep. 26, 2006.

(51) Int. Cl.
*H04B 7/00* (2006.01)
(52) U.S. Cl. ........ 455/522; 455/69; 455/13.4; 455/3.05; 455/41.2; 455/90.2; 713/320
(58) Field of Classification Search .................. 455/522, 455/69, 13.4, 3.05, 41.2, 90.2, 127.1–127.5; 370/318; 713/320
See application file for complete search history.

(56) References Cited

U.S. PATENT DOCUMENTS

| 7,187,664 | B2 * | 3/2007 | Hiltunen | 370/318 |
| 2004/0132415 | A1 * | 7/2004 | Furukawa | 455/78 |
| 2006/0195239 | A1 * | 8/2006 | Teichner et al. | 701/36 |
| 2007/0066228 | A1 * | 3/2007 | Leinonen et al. | 455/67.11 |
| 2007/0072606 | A1 * | 3/2007 | van Rooyen | 455/434 |
| 2008/0076352 | A1 * | 3/2008 | Der | 455/41.2 |

OTHER PUBLICATIONS

International Search Report and Written Opinion dated Jun. 9, 2008 cited in PCT/US07/76049.

* cited by examiner

*Primary Examiner* — Shaima Q Aminzay

(57) ABSTRACT

A method is provided for operating a two-way communications service station having a maximum transmitter power adapted to avoid interference to broadcast station receivers. The communications service station shares a frequency band with the broadcast service station transmitter. The method includes periodically tuning the communications service station to the frequency band being used by the broadcast service station and detecting the presence of signals above a predetermined power level on frequencies known to be used by the broadcast station. The method further includes raising the maximum transmitter power limit for the two-way communications service station to a higher power level if the power level of the detected signal is above the predetermined power level.

18 Claims, 2 Drawing Sheets

A broadcasting station transmitter and a mobile wireless station transceiver share the same frequency band in the same geographic area A broadcasting station transmitter and a mobile wireless station transceiver share the same frequency band in the same geographic area

ADAPTIVE INTERFERENCE AVOIDANCE METHOD

CROSS REFERENCES TO RELATED APPLICATIONS

This application claims the benefits of U.S. Provisional Application Ser. No. 60/847,183, which was filed on Sep. 26, 2006.

BACKGROUND OF THE INVENTION

The present disclosure relates to a method for operating two-way communications service stations, and more particularly to a method for operating a mobile wireless station having a prescribed maximum transmitter power and spurious emission requirement.

When one-way broadcasting services and two-way communication services share the same frequency band in the same geographic area, broadband interference from each communication service subscriber station can degrade the signal-to-noise (S/N) ratio of nearby broadcast receivers. The broadcasted signals decrease in power following an inverse square ratio, decreasing by a factor of 4 as distance doubles. However, a required minimum S/N ratio of a broadcast receiver remains constant as the receiver moves closer to the broadcast transmitter and the receiving broadcast signal level increases.

If the transmitter power and spurious emission requirements for the communication service subscriber stations are set to prevent interference to broadcast receivers for the weak signal in the farthest distance from the broadcast transmitter, the power and spurious emission levels will be more restrictive than necessary to protect broadcast receivers close to the broadcast transmitter.

As such, what is desired is an improved method for operating two-way communications service stations including mobile wireless stations having a prescribed transmitter power and spurious emission requirement.

SUMMARY OF THE INVENTION

In view of the foregoing, the techniques described herein relate to a method for operating two-way communications service stations, and particularly to a method for operating a mobile wireless station having a prescribed maximum transmitter power and spurious emission limits. The techniques also allow the two-way communication subscriber stations to automatically detect the presence of a strong broadcast signal and select more relaxed transmitter power and spurious emissions limits.

The disclosed method improves quality of the wireless communication by operating two-way communication service station at a higher power level than would be allowed to protect the weak signal edge of broadcast range case when the power level of broadcast signal is above a predetermined level. Using the techniques described herein, the communications service station can use contractually relaxed emission limits to operate subscriber station transmitters at higher power levels than would normally be allowed.

According to an embodiment, a method for operating a two-way communication service station including a mobile wireless station is disclosed. The mobile wireless station has maximum prescribed transmitter power and spurious emission limits in order to reduce interference to broadcast receivers in the frequency band shared by a broadcast service station and a mobile wireless station.

The method includes operating a two-way communications service station having a maximum transmitter power adapted to power level of the broadcasted signals without increasing interference to broadcast station receivers wherein the communications service station shares a frequency band with the broadcast service station transmitter. The method includes periodically tuning the communications service station to the frequency band being used by the broadcast service station and detecting whether the power level of the present signals is above a predetermined power level on frequencies known to be used by the broadcast station. The method further includes raising the maximum transmitter power limit for the two-way communications service station to a higher power level if the power level of the detected broadcast signal is above the predetermined power level.

The features and advantages described in the specification are not all inclusive, and particularly, many additional features and advantages will be apparent to one of ordinary skill in the art in view of the drawings, specification, and claims hereof. The construction and method of operation of the techniques described herein, however, together with additional objects and advantages thereof will be best understood from the following description of specific embodiments when read in connection with the accompanying drawings.

BRIEF DESCRIPTION OF THE DRAWINGS

The techniques are herein described with reference to the accompanying drawings. The drawings depict example embodiments for purposes of illustration only.

DETAILED DESCRIPTION OF THE INVENTION

The techniques described herein relate to a method for operating two-way communications service stations, and particularly to a method for operating a mobile wireless station having a prescribed maximum transmitter power and spurious emission limits. More particularly, a method is provided for operating a mobile wireless station at a higher power level than would be normally allowed but still maintaining a minimum S/N ratio of the broadcast receiver.

The assumption for the techniques described herein is that the one-way broadcast service is using frequency allocations within the tuning range of the two-way communications service transceiver. In normal operation, the receiver section of the communications service periodically tunes across its band of operation to detect which base station has the best signal quality. While the two-way communications transceiver is tuning across its frequency band of operation, it also tunes to frequency channels that are being used for one-way broadcasting. The present disclosure proposes that the communications transceiver maps the frequencies of strong broadcast signals along with frequencies of base stations of the communications network.

Broadcast signals can be distinguished from two-way communications signals due to the following characteristics. 1) Unique frequencies only are used for broadcasting. For example, the DARS terrestrial repeater frequencies are only used for broadcasting. 2) In frequency bands where time division duplexing is used for communications services, channels with broadcasting signals will have a steady power output while communications signals will have a distinctive on/off characteristic as the source of the signal alternates between transmitting and receiving modes. For example, mobile WiMAX signals have a distinctive on off characteristic with a 5 ms period while digital television signals will have a relatively constant power output.

Figure 1:
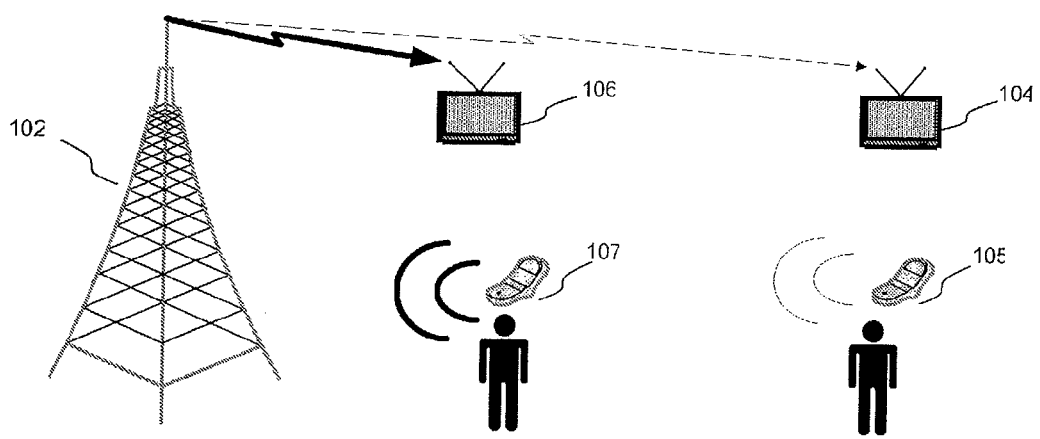
FIG. 1 illustrates a broadcasting station transmitter and a mobile wireless station transceiver sharing the same frequency band in the same geographic area.

FIG. 1 illustrates a broadcasting station and a mobile wireless station sharing the same frequency band in the same geographic area. The required S/N ratio at a broadcast receiver 104 remains constant as the broadcast receiver moves close to the broadcast station transmitter 102 even though the signal level increases. Accordingly, the maximum transmitter output power level for the two-way communications service transceiver 107 can be increased to a higher power in proportion to the received broadcast signal levels without degrading the required S/N ratio at the broadcast receiver 106. The signal with the increased transmitter output power at the transceiver 107 is indicated in bold lines compared with the signal in fine lines at the transceiver 105.

Figure 2:
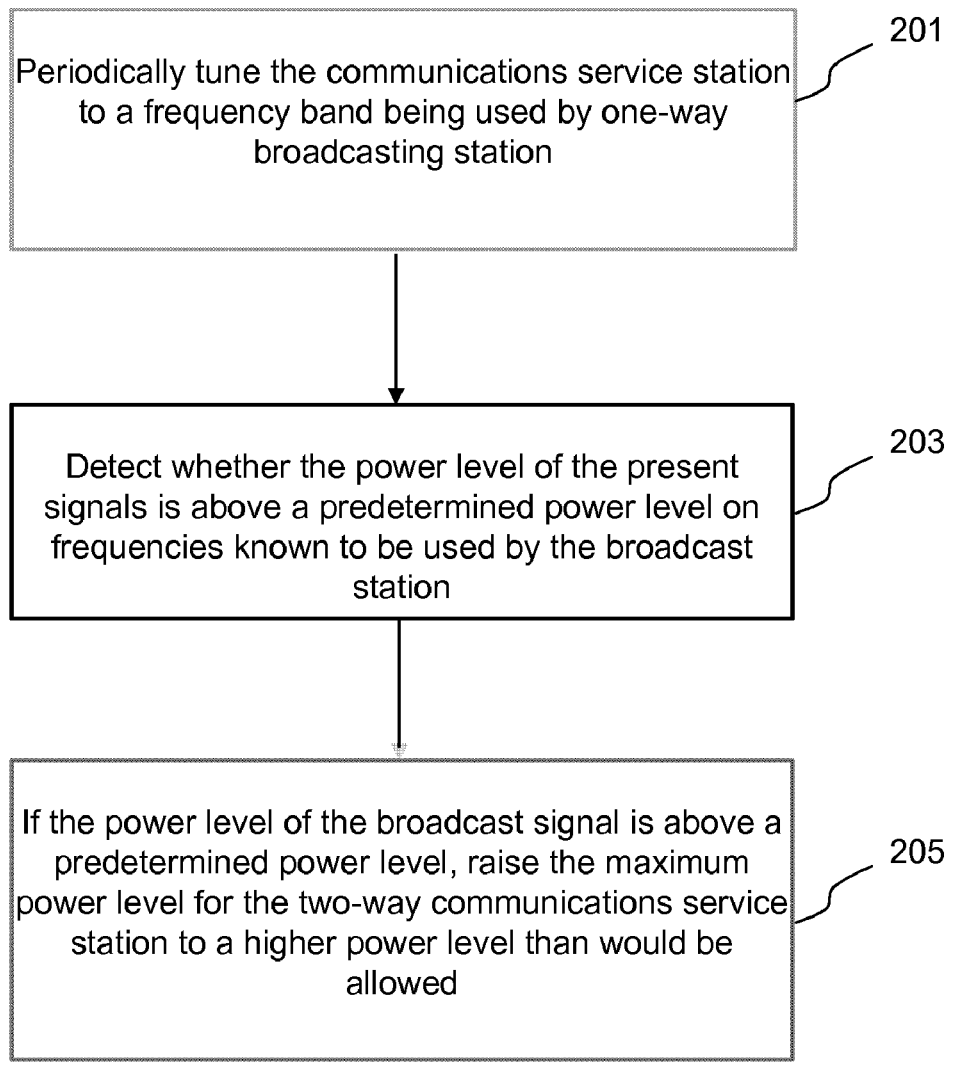
FIG. 2 is a flow chart illustrating the steps for raising a maximum allowable power level.

The flow diagrams of FIG. 2 summarize the steps for raising a maximum allowable power level. Step 201 summarizes the procedural steps for the disclosed embodiment where the two-way communications service transceiver periodically tunes to the frequency channels that are being used by one-way broadcasting station transmitters within the same frequency band shared by the broadcasting service station and a two-way communications station.

Based on the received broadcast signal level, the communications service subscriber station assumes that broadcast receivers are close enough to be affected by the two-way communications service station transmitter are also receiving a similar signal level. The next step is to detect whether the power level of the present signals is above a predetermined power level on frequencies known to be used by terrestrial broadcast station transmitters as summarized in step 203.

If the power level of the broadcast signal is above a predetermined level, the maximum output power limit or cap for the two-way communications transceiver is increased to a higher power level than would be allowed which is summarized in step 205. The maximum transmitter power and spurious emissions limit for the communications service transmitter is then increased to a higher power level in proportion to the received broadcast signal levels. Here, the higher power level and corresponding more related out-of-band emissions limit are predetermined by experiments and analysis that show that the broadcast receivers are less susceptible to interference when the broadcast signal is above a threshold received power level.

Two-way communications services and one-way broadcast services are currently mixed together in the following frequency bands in the United States; 470-806 MHz, 2305-2360 MHz, and 2496-2690 MHz. Current FCC regulations allow the 2.3 GHz WCS and 2.5 GHz BRS/EBS emissions limits to be modified by private contractual agreement. In theory, broadcast services in these bands could lease their excess S/N ratio to communications services on adjacent frequency allocations. The communications services could use these contractually relaxed emissions limits to operate subscriber station transmitters at higher power levels than would normally be allowed. Thus, the techniques described herein allow the subscriber station to automatically detect the presence of a strong broadcast signal and select more relaxed transmitter power and spurious emissions limits.

One application of the techniques described herein would be to design a 2.3 GHz WCS band communications transceiver that periodically checks for the presence of signals above a predetermined power level on frequencies known only to be used for terrestrial repeater broadcast transmitters. If broadcast signals above a predetermined power level are detected, the maximum power output limit for that transceiver is raised to a higher power level than would be allowed. The higher power level and corresponding more relaxed out-of-band emissions limit are predetermined by experiments and analysis that show that the DARS broadcast receivers are less susceptible to interference when a terrestrial repeater broadcast signal is above a threshold received power level.

As mentioned above, current FCC regulations allow the 2.3 GHz WCS and 2.5 GHz BRS/EBS emissions limits to be modified by private contractual agreement. For example, shown below is an exemplary emissions limit clause for 2.3 GHz WCS private contract: "(10) The out-of-band emissions limits in paragraphs (a)(1) through (a)(9) of this section may be modified by the private contractual agreement of all affected licensees, who shall maintain a copy of the agreement in their station files and disclose it to prospective assignees or transferees and, upon request, to the Commission."

Also, shown below is an exemplary emissions limit clause for 2.5 GHz EBS/BRS private contract: "(7) Alternative out of band emission limit. Licensees in this service may establish an alternative out of band emission limit to be used at specified band edge(s) in specified geographical areas, in lieu of that set forth in this section, pursuant to a private contractual arrangement of all affected licensees and applicants. In this event, each party to such contract shall maintain a copy of the contract in their station files and disclose it to prospective assignees or transferees and, upon request, to the FCC."

The above description is by way of example only.

What is claimed is:

1. A method comprising:
    at a two-way communications service station configured to communicate in a shared radio frequency band, periodically tuning the two-way communications service station to frequency channels in the shared radio frequency band being used by a broadcast service station, wherein the two-way communications service station has a maximum transmitter power in order to maintain a required minimum signal-to-noise (S/N) ratio of broadcast station receivers so as to avoid interference to the broadcast station receivers due to emissions from the two-way communication service station in the frequency channels used by the broadcast service station in the shared radio frequency band;
    detecting whether a power level of a broadcast signal from the broadcast service station in the shared radio frequency band is above a predetermined power level; and
    raising the maximum transmitter power limit for the two-way communications service station to a higher power level if the power level of the detected broadcast signal is above the predetermined power level.

2. The method of claim 1, further comprising determining the higher power level by experiments and analysis, such that the signal-to-noise ratio at the broadcast receivers remains substantially constant.

3. The method of claim 1, wherein raising comprises raising the maximum transmitter power for the two-way communications service station to the higher level in proportion to the power level of the detected broadcast signal that is above the predetermined power level.

4. The method of claim 1, wherein detecting comprises periodically detecting a presence of the broadcast signal above the predetermined power level.

5. The method of claim 1, further comprising determining the higher power level by experiments and analysis, such that the broadcast receivers are not susceptible to interference due to the increased power level.

6. The method of claim 1, wherein raising comprises raising the maximum transmitter power for the two-way communications service station to a power level that exceeds a power level allowed by a regulatory authority.

7. The method of claim 6, wherein raising comprises raising the maximum transmitter power for the two-way communications service station to a power level that exceeds the power level allowed by the regulatory authority up to a limit specified by a contractual agreement.

8. The method of claim 1, further comprising selecting more relaxed spurious emissions limits level if the power level of the detected broadcast signal is above the predetermined power level.

9. The method of claim 1, wherein the frequency channels used by the broadcast service station are adjacent to frequency allocated for the two-way communication service station for transmission.

10. A method comprising:
at a mobile wireless station configured to communicate in a shared radio frequency band, periodically tuning the mobile wireless station to frequency channels in the shared radio frequency band being used by a broadcast service station, wherein the mobile wireless station has a maximum transmitter power and spurious emission limit in order to avoid interference with broadcast station receivers due to emissions from the mobile wireless station in the frequency channels used by the broadcast service station in the shared radio frequency band;
detecting whether a power level of a broadcast signal from the broadcast service station in the shared radio frequency band is above a predetermined power; and
raising the maximum transmitter power limit for the mobile wireless station to a higher power level if the power level of the detected broadcast signal is above the predetermined power level.

11. The method of claim 10, further comprising determining the higher power level by experiments and analysis, such that the signal-to-noise ratio at the broadcast receivers remains substantially constant.

12. The method of claim 10, wherein raising comprises raising the maximum transmitter power for the mobile wireless station to the higher power level in proportion to the power level of the detected broadcast signal that is above the predetermined power level.

13. The method of claim 10, wherein detecting comprises periodically detecting a presence of broadcast signal above the predetermined power level.

14. The method of claim 10, further comprising determining the higher power level by experiments and analysis, such that the broadcast receivers are not susceptible to interference due to the increased power level.

15. The method of claim 10, wherein raising comprises raising the maximum transmitter power for the mobile wireless station to a power level that exceeds a power level allowed by a regulatory authority.

16. The method of claim 15, wherein raising comprises raising the maximum transmitter power for the mobile wireless station to a power level that exceeds the power level allowed by the regulatory authority up to a limit specified by a contractual agreement.

17. The method of claim 10, further comprising selecting more relaxed spurious emissions limits level if the power level of the detected broadcast signal is above the predetermined power level.

18. The method of claim 10, wherein the frequency channels used by the broadcast service station are adjacent to frequency allocated for the mobile wireless station for transmission.

\* \* \* \* \*